United States Patent [19]

Gardner et al.

[11] Patent Number: 5,553,054
[45] Date of Patent: Sep. 3, 1996

[54] COARSE POSITION SENSOR, AND METHOD FOR LOCATING SAME, IN AN OPTICAL DISK DRIVE

[75] Inventors: Timothy S. Gardner, Tucson, Ariz.; Tomoaki Kimura, Fujisawa, Japan; Delbert A. Hansen, Tucson, Ariz.

[73] Assignee: International Business Machines Corporation, Armonk, N.Y.

[21] Appl. No.: 384,176

[22] Filed: Feb. 6, 1995

[51] Int. Cl.⁶ .................................................. G11B 7/00
[52] U.S. Cl. .................. 369/117; 369/44.14; 369/44.17; 369/32
[58] Field of Search .................................. 369/32, 44.28, 369/44.29, 44.32, 44.38, 44.26, 44.14, 44.17, 117, 111

[56] References Cited

U.S. PATENT DOCUMENTS

| | | | |
|---|---|---|---|
| 4,426,694 | 1/1984 | Kimura | 369/44.28 |
| 4,805,162 | 2/1989 | Stahl et al. | 369/111 |
| 5,095,473 | 3/1992 | Gotoh | 369/44.14 |
| 5,140,572 | 8/1992 | Kibune et al. | 369/44.14 |

*Primary Examiner*—Nabil Z. Hindi
*Assistant Examiner*—Kim-Kwok Chu
*Attorney, Agent, or Firm*—D. A. Shifrin

[57] ABSTRACT

A coarse position sensor is provided for an optical recording device to generate a substantially linear coarse position signal, indicative of the position of a coarse carriage along the range of its travel, and which also is substantially immune to environmental and device variations. The sensor includes a light source mounted to a drive frame at one end of the range of travel, a position sensitive device fixed to the frame at the opposite end of the range of travel and facing the light source, and a deflecting optical element mounted to the coarse carriage in the path of the light. As the coarse carriage travels along its stroke between the inner and outer diameters of the optical disk, the amount of deflection of the light beam on the position sensitive device from a reference location will change. Based upon a trigonometric equation, a coarse position signal generator receives the output of the position sensitive device and generates a substantially linear coarse position signal indicative of the position of the coarse carriage.

11 Claims, 3 Drawing Sheets

COARSE POSITION SENSOR, AND METHOD FOR LOCATING SAME, IN AN OPTICAL DISK DRIVE

TECHNICAL FIELD OF THE INVENTION

The present invention relates to optical recording devices, and in particular, to generating a substantially linear coarse position signal in an optical drive.

BACKGROUND OF THE INVENTION

In an optical storage system, data on an optical disk is stored in spiral or concentric tracks. A laser beam is directed through a series of optical elements and focused as a beam spot on a surface of the disk. Typically, a coarse carriage, on which is mounted an optical head with an objective lens through which the beam passes, is moved along a radial path to enable the beam spot to be moved between the inner and the outer tracks of the disk near the inner and outer diameters of the disk. The resolution of the coarse carriage and controlling servo loop is generally sufficient only to permit the beam spot to be positioned within a few tracks (such as ±5 tracks) of a desired target track. Consequently, a fine tracking actuator is employed to supplement the coarse carriage by finely controlling the beam spot to position and maintain it on a single target track.

In order to achieve accurate and rapid power-on calibration as well as track seeking, the position of the coarse carriage should be known. A coarse position sensor associated with the coarse carriage generates a coarse position sensing (CPS) signal, which bears a known relationship to the position of the coarse carriage relative to the drive frame, to provide the drive controller with this information.

As will be appreciated, it is desirable that the CPS signal be substantially linear over the range of motion of the coarse carriage and be substantially independent of variations due to such conditions as environment or component heating and aging. It is also desirable for a sensor to be small, inexpensive and of low mass so as to have as little impact as possible on the seeking and tracking performance of the drive.

SUMMARY OF THE INVENTION

In view of the foregoing, it is an object of the present invention to provide a method and apparatus for generating a coarse position signal which does not rely on an expensive and bulky sensor.

It is a further object to provide a method and apparatus for which yields a coarse position signal which is substantially linear and does not appreciably vary from drive to drive with time.

These and other objects are achieved in this invention by mounting a light source proximate one end of the range of travel of the coarse carriage and projecting a beam of light toward the opposite end, mounting a one-dimensional position sensitive device proximate the opposite end of the range of travel facing the light source, and mounting a deflecting optical element to the coarse carriage in the path of the light. As the coarse carriage travels along the radial path, the light beam is deflected to strike different locations on the position sensitive device, thereby changing the output signal of the device. Means are provided to generate a coarse position signal based upon the output signal of the position sensitive device and representative of the position of the coarse carriage.

The foregoing and other features and advantages of the invention will be apparent from the following more particular description of preferred embodiments of the invention, as illustrated in the accompanying drawings.

DETAILED DESCRIPTION OF THE INVENTION

Figure 1:
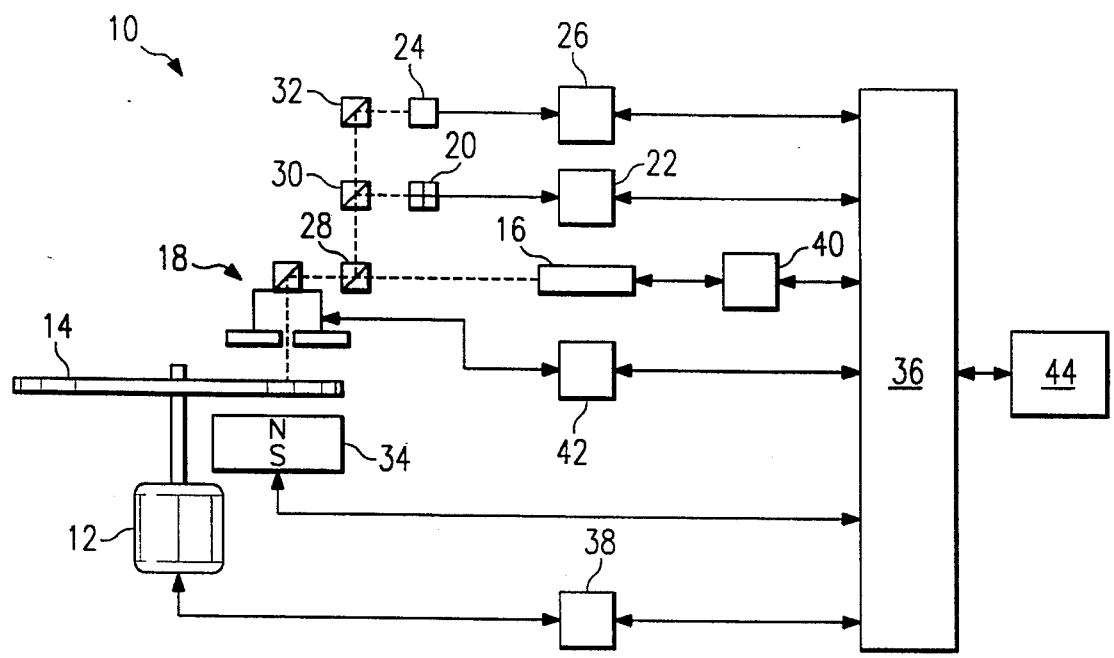
FIG. 1 is a block diagram of an optical recording device of the present invention.

FIG. 1 is a block diagram of an optical recording device 10 of the present invention which comprises a motor and spindle 12 on which an optical disk 14 is mounted for rotation, a light source 16, such as a laser, an optical head 18, a focus servo detector, such as a quadrant photodetector 20, with associated focus and tracking circuits 22, and a photodetector module 24 with associated data read/write circuits 26. Various optical elements 28, 30 and 32 are employed to direct the light from the laser 16 through the head 18 onto a surface of the disk 14 and to direct light reflected from the surface onto the detectors 20 and 24. If the drive 10 is a magneto-optical drive, a reversible bias magnet 34 is employed during erasing and writing operations. A drive controller 36 controls the motor 12, the laser 16 and the head 18 through a motor controller 38, a laser driver 40 and a head actuator 42, respectively, and also controls the magnet 34. The controller 36 is also interconnected to a host device 44 for the exchange of data and control signals.

Figure 2:
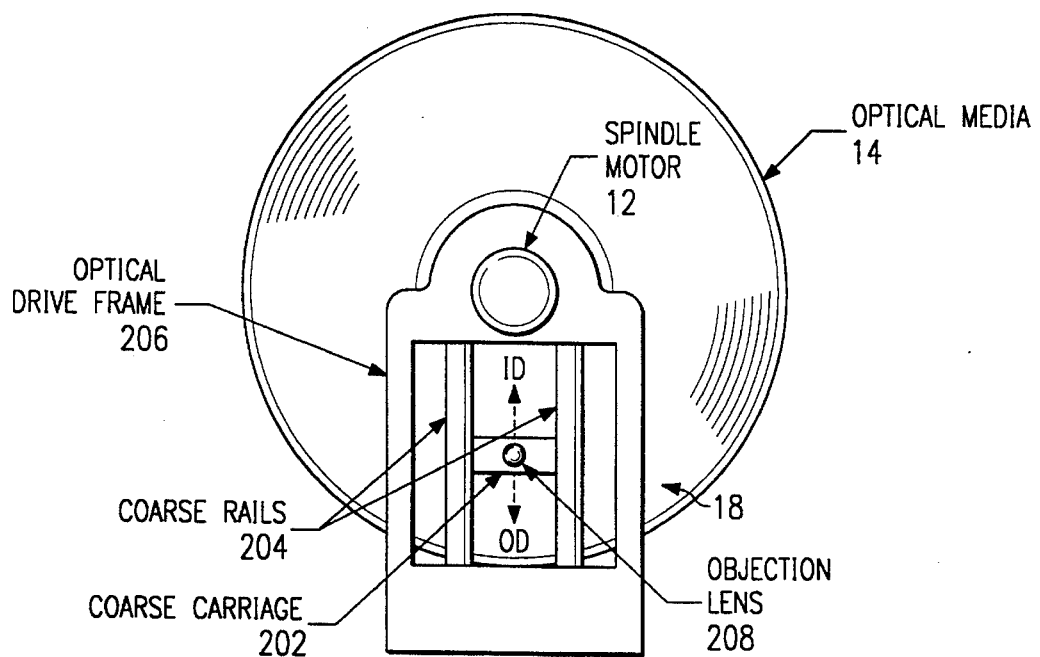
FIG. 2 is a schematic overhead view of the coarse carriage portion of the optical recording device.

Referring now to FIG. 2, the optical head 18 includes a coarse carriage 202 propelled by a linear motor or similar device along rails 204 mounted to a drive frame 206. The carriage 202 travels radially relative to the disk 14 between inner and outer positions approximately corresponding to the inner and outer diameters (ID and OD) of the disk 14. An objective lens 208 and associated mechanical and optical elements mounted to the carriage 202 enable the light beam from the laser 16 to be focused on the desired track of the disk 14.

Figure 3A:
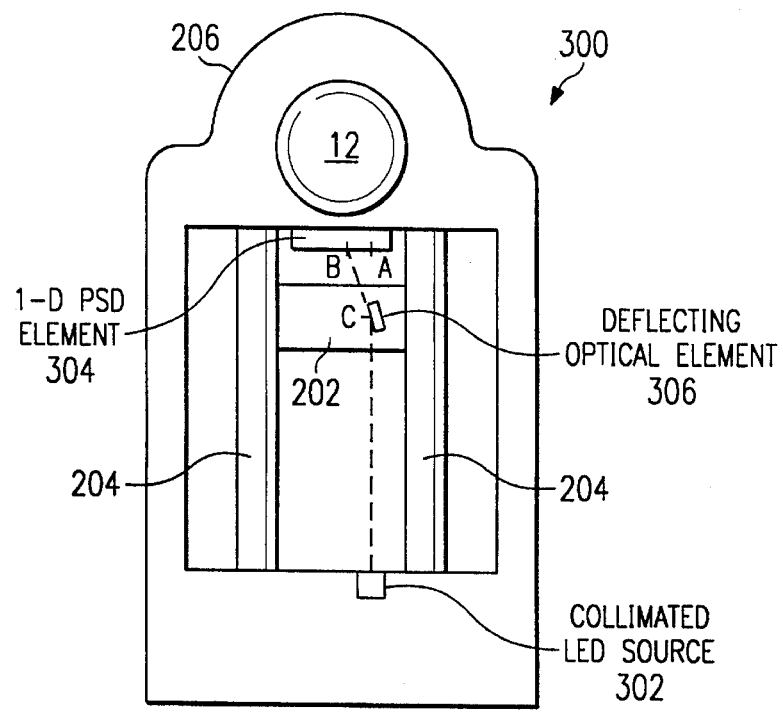
FIG. 3A is a schematic bottom view of the coarse position sensor of one embodiment of the present invention with the coarse carriage proximate the inner-diameter of the optical disk.

FIG. 3A is a schematic bottom drawing of the coarse position sensor 300 of the present invention. The sensor 300 includes a light source, such as a collimated light emitting diode (LED) 302, secured to the drive frame 206 near the outer limit of the range of travel of the carriage 202 and capable of projecting light toward the inner limit of travel. A one-dimensional position sensitive device (PSD) 304 is secured to the drive frame 206 near the inner limit of travel of the carriage 202 with a photosensitive surface aimed toward the LED 302. The PSD 304 has an output which varies substantially linearly with the position on the front surface at which light is focused. Although the FIGS. and related description show the light source 302 and the PSD 304 as being fixed at inner and outer positions, respectively, of the carriage frame 206, the present invention is not limited to such a configuration and it will be appreciated their positions can be reversed.

The coarse position sensor 300 also includes a deflecting optical element 306 mounted to, and travelling with, the coarse carriage 202. The optical element 306 can be, for example, a grazing incident mirror or a refracting wedge. The element 306 is located in the path of the light from the light source 302 and is positioned so as to deflect the light at a small, fixed angle $\phi$ onto the PSD 304.

Figure 3B:
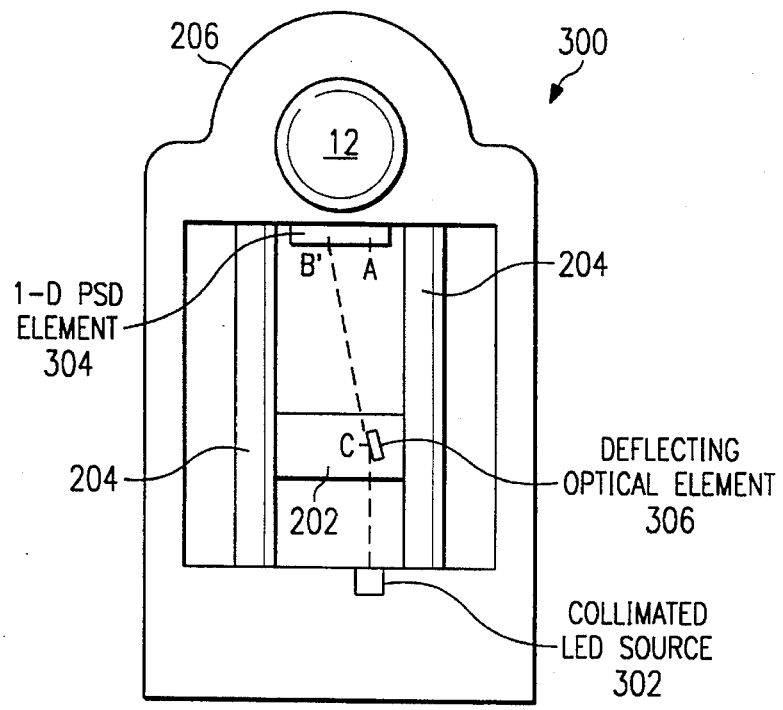
FIG. 3B is a schematic bottom view of the coarse position sensor of FIG. 3A with the coarse carriage proximate the outer-diameter of the optical disk.

As shown in FIG. 3A, in the absence of the optical element 306, the light from the LED 302 would strike the PSD 304 at a reference location, indicated with a label A. When the coarse carriage 202 and the optical element 306 are near the inner limit of travel of the coarse carriage 202, the light is deflected across the PSD 304 a small distance to a second location B. As the coarse carriage 202 moves outward, the light is deflected across an increasingly longer distance until, when the coarse carriage 202 is near the outer limit of travel, as shown in FIG. 3B, the light strikes the PSD 304 at a third location B'.

From basic trigonometry, it will be apparent that the distance AC between the PSD 304 and the optical element 306 is related to the distance AB by: $AC=AB/\tan(\phi)$, where $\phi$ is the constant angle ACB. Because the output of the PSD 304 bears a substantially linear relationship to the distance between the reference point A and the point B on which the light beam falls, the position of the coarse carriage 202 on its stroke between the inner and outer diameters of the optical disk can be calculated by the a coarse position signal generator in the drive controller 36.

Figure 4A:
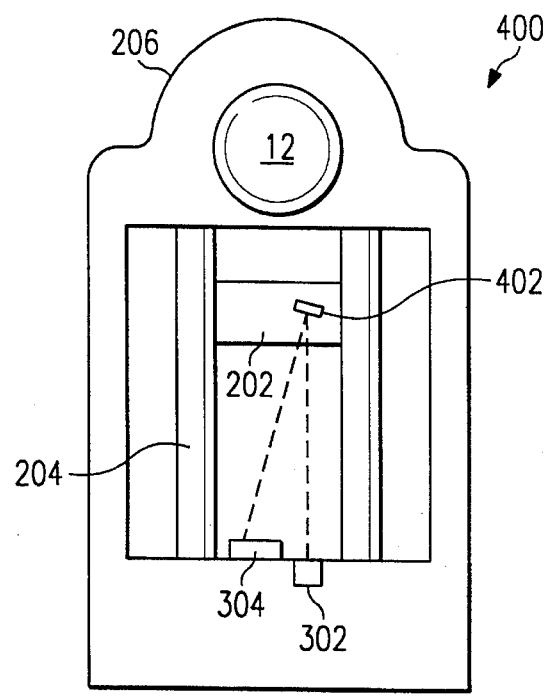
FIG. 4A is a schematic bottom view of the coarse position sensor of another embodiment of the present invention with the coarse carriage proximate the inner-diameter of the optical disk.
Figure 4B:
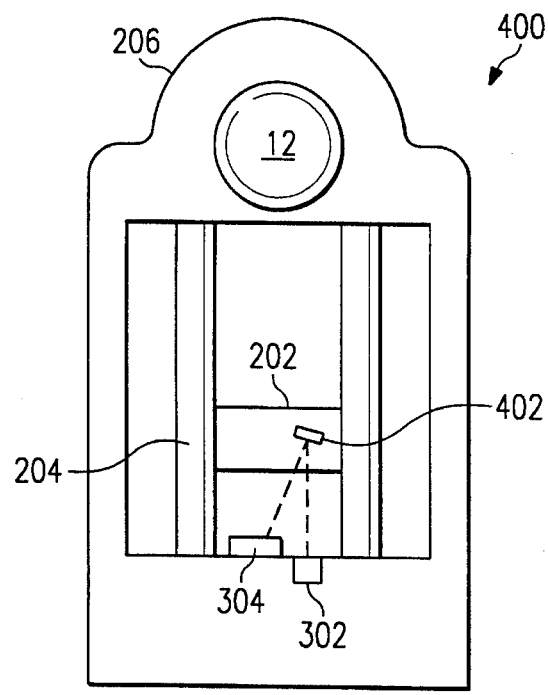
FIG. 4B is a schematic bottom view of the coarse position sensor of FIG. 4A with the coarse carriage proximate the outer-diameter of the optical disk.

In another configuration of a coarse position sensor 400 illustrated in FIGS. 4A and 4B, the PSD 304 can be mounted adjacent the LED 302 and an optical element 402, such as a mirror, can be mounted to the coarse carriage 202 at such an angle so as to reflect the light beam block to the PSD 304. As in the embodiment illustrated in FIGS. 3A and 3B, the location on the PSD 304 at which the light beam strikes will vary as the carriage 202 travels between the inner and outer diameters of the optical disk 14.

While the invention has been particularly shown and described with reference to preferred embodiments thereof, it will be understood by those skilled in the art that various changes in form and details may be made therein without departing from the spirit and scope of the invention.

What is claimed is:

1. A coarse position sensor for an optical disk drive, comprising:

a coarse carriage movable radially relative to an optical recording disk between inner and outer limits in a carriage frame;

a light source mounted proximate the outer limit of the carriage frame to project a light beam towards the inner limit;

a position sensitive device, mounted proximate the inner limit of the carriage frame, having a photosensitive surface facing said light source and a substantially linear output representative of a location of a beam spot irradiated from the light beam on said photosensitive surface relative to a reference position;

a deflecting optical element mounted to said coarse carriage to deflect the light beam at a fixed angle thereto whereby the location of the beam spot on said photosensitive surface varies with the distance of said coarse carriage from the inner limit; and a coarse position signal generator coupled to said position sensitive device for generating a coarse position signal representative of the position of said coarse carriage.

2. The coarse position sensor of claim 1, wherein said coarse position signal generator comprises means for calculating $AC=AB/\tan(\phi)$, where AC is the distance of said deflecting optical element from said position sensitive device, AB is the distance between the reference position on said photosensitive surface and the location of the light spot on said photosensitive surface, and $\phi$ is a constant angle ACB by which the light beam is deflected by said deflecting optical element.

3. The coarse position sensor of claim 1, wherein said deflecting optical element comprises a grazing incident mirror.

4. The coarse position sensor of claim 1, wherein said deflecting optical element comprises a refracting wedge.

5. An optical recording device, comprising:

a motor to which an optical disk is mounted, said motor mounted to a frame and the disk having inner and outer diameters;

a first light source;

a coarse carriage movable in a radial path relative to the disk between the inner and outer diameters;

an optical head mounted to said coarse carriage and movable therewith for directing light from said first light source onto a surface of the disk and for directing light reflected from the surface of the disk onto a first photodetector whereby data recorded on the surface of the disk is readable;

a second light source mounted at a first position on said frame for projecting a beam of light along the radial path of said coarse carriage;

a position sensitive device mounted at a second position on said frame to receive the beam of light from said second light source and generate an output signal indicative of a location on said position sensitive device on which the beam of light is received;

a optical element mounted to said coarse carriage for deflecting the beam of light from said second light source by a constant angle $\phi$ whereby, as said coarse carriage travels along the radial path, the location of beam of light on said position sensitive device varies; and means, coupled to receive said output signal from said position sensitive device, for generating a coarse position signal representative of the position of said coarse carriage along the radial path.

6. The optical recording device of claim 5, wherein said coarse position signal generator comprises means for calculating $AC=AB/\tan(\phi)$, where AC is the distance of said optical element from said position sensitive device, AB is the distance between a reference position on said position sensitive device and the position on said position sensitive device where the light beam is received and $\phi$ is the constant angle ACB by which the light beam is deflected by said optical element.

7. The coarse position sensor of claim 5, wherein said optical element comprises a grazing incident mirror.

8. The coarse position sensor of claim 5, wherein said optical element comprises a refracting wedge.

9. A method for generating a coarse position signal indicative of a position of a movable optical head along a radial path relative to an optical disk mounted in an optical disk drive, comprising the steps:

activating a light source mounted to a drive frame proximate a first position and projecting a light beam along the radial path;

moving the optical head between the first position and a second position;

deflecting the light beam from the light source by an optical element mounted to the optical head;

receiving light from the light source at a location on a position sensitive device mounted to the frame proximate the second position;

generating an output signal from the position sensitive device indicative of the location on the position sensitive device where the beam of reflected light falls; and generating a coarse position signal based upon the output signal and proportional to the distance between the optical head and a reference position.

10. The method of claim 9, wherein said step of generating a coarse position signal comprises the step of calculating $AC=AB/\tan(\phi)$, where AC is the distance of the optical element from the position sensitive device, AB is the distance between a reference position on the position sensitive device and the location where the light strikes the position sensitive device, and $\phi$ is a constant angle ACB by which the light beam is deflected by the optical element.

11. A coarse position sensor for an optical disk drive, comprising:

a coarse carriage movable radially relative to an optical recording disk between inner and outer limits in a carriage frame;

a light source mounted proximate the outer limit of the carriage frame to project a light beam towards the inner limit;

a position sensitive device, mounted adjacent to said light source proximate the outer limit of the carriage frame, having a photosensitive surface facing the inner limit of the carriage frame and a substantially linear output representative of a location of a beam spot irradiated from the light beam on said photosensitive surface relative to a reference position;

a reflecting optical element mounted to said coarse carriage to reflect the light beam at a fixed angle thereto to direct the light spot onto said photosensitive surface whereby the location of the beam spot on said photosensitive surface varies with the distance of said coarse carriage from the inner limit; and a coarse position signal generator coupled to said position sensitive device for generating a coarse position signal representative of the position of said coarse carriage.

\* \* \* \* \*